United States Patent [19]
Nilsson

[11] 3,917,188

[45] Nov. 4, 1975

[54] ACCELERATION SENSITIVE LOCKING DEVICE, ESPECIALLY FOR SAFETY BELTS IN VEHICLES

[76] Inventor: Karl Erik Nilsson, Fiskaregatan 49, 441 00 Alingsas, Sweden

[22] Filed: Sept. 19, 1973

[21] Appl. No.: 398,857

[30] Foreign Application Priority Data
July 20, 1972 Sweden............................ 12118/72

[52] U.S. Cl. ............................................ 242/107.4
[51] Int. Cl.² ........................................ B65H 75/48
[58] Field of Search ....... 242/107.4, 107 R, 107.5 B

[56] References Cited
UNITED STATES PATENTS

| | | | |
|---|---|---|---|
| 3,240,510 | 3/1966 | Spouge | 242/107.4 X |
| 3,294,339 | 12/1966 | Fontaine | 242/107.4 |
| 3,489,367 | 1/1970 | Kovacs et al. | 242/107.4 |
| 3,667,698 | 6/1972 | Fisher | 242/107.4 |
| 3,724,773 | 4/1973 | Fisher | 242/107.4 |
| 3,740,000 | 6/1973 | Takada | 242/107.4 |
| 3,741,495 | 6/1973 | Takada | 242/107.4 |
| 3,770,224 | 11/1973 | Hayashi et al. | 242/107.4 |
| 3,771,814 | 11/1973 | Hahn | 242/107.4 |

*Primary Examiner*—Stanley N. Gilreath
*Attorney, Agent, or Firm*—Ulle C. Linton

[57] ABSTRACT

An acceleration sensitive locking device for stopping the unwinding of vehicle safety belts from a coil thereof when the vehicle is under larger than normal acceleration forces as when the vehicle is in a collision with a toothed wheel connected to the safety belt coil and a clasp is loosely mounted in a housing which clasp is moved into engagement with said toothed wheel to prevent rotation thereof when an abnormal acceleration force is present.

6 Claims, 6 Drawing Figures

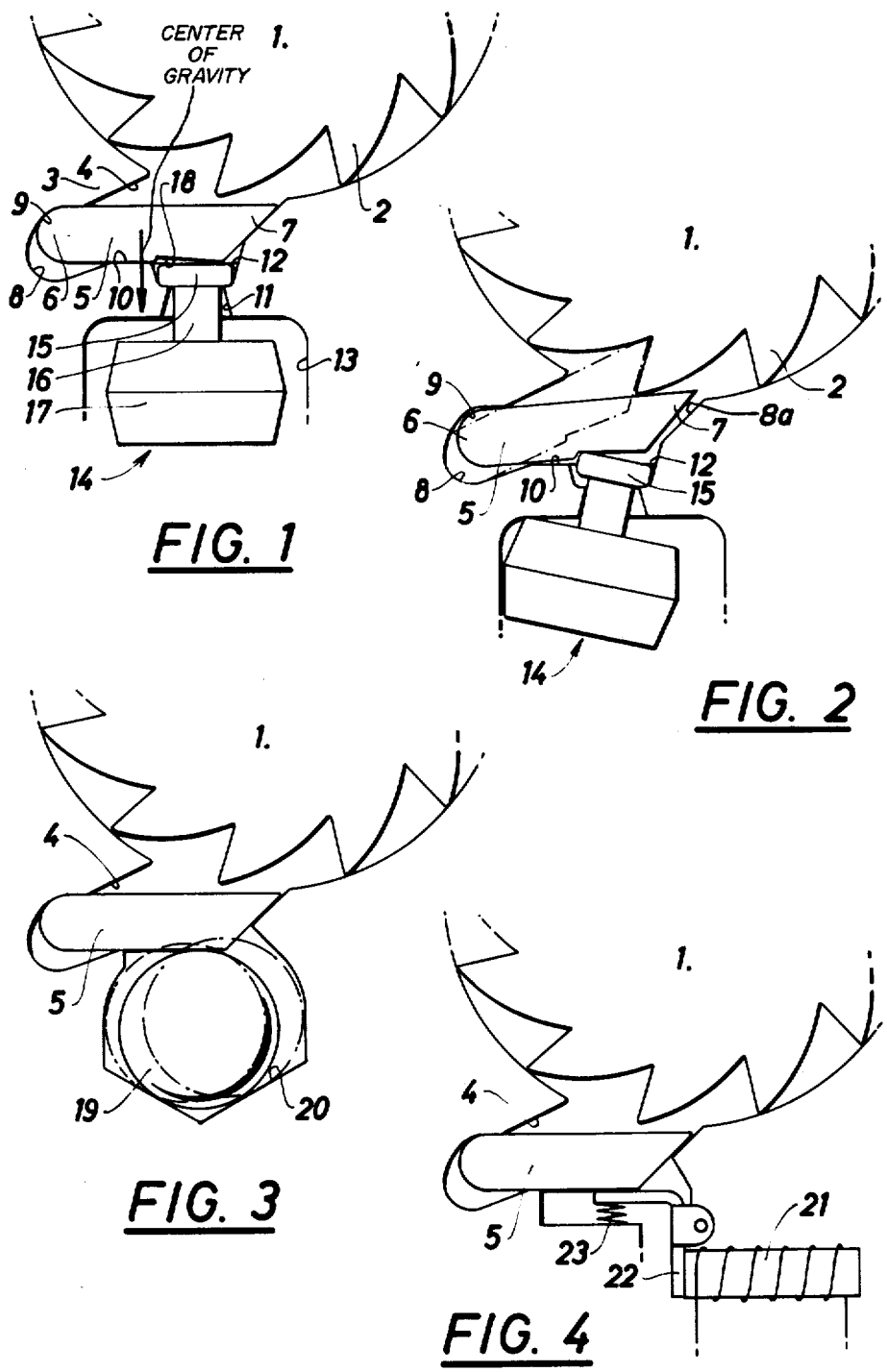

ACCELERATION SENSITIVE LOCKING DEVICE, ESPECIALLY FOR SAFETY BELTS IN VEHICLES

BRIEF SUMMARY OF THE INVENTION

The present invention relates to an acceleration sensitive locking device, especially for safety belts in vehicle where the safety belt's strap is partly rolled up when in use and shall be locked against unrolling when acceleration forces over a certain level affect the safety belt device, whereby the locking device is constructed to stop movement in at least one direction of a toothed wheel by means of a locking clasp, which thereby from a normal position outside the toothed wheel movement area is arranged to be brought into engagement with said toothed wheel by action device, when this is affected by a certain increased degree of the acceleration force.

BACKGROUND OF THE INVENTION

On safety belts for vehicles which can be unrolled and rolled, a locking device is necessary, which keeps the safety belt from unrolling from the shaft, when the vehicle in, for example, a collision is affected by unnormal acceleration forces. This is provided for on the existing safety belts, on which the strap itself is rolled up with the help of a spring on a shaft, which is constructed to lock at least in the direction of unrolling, by a locking device constructed to be actuated under influence of unnormal acceleration forces. On such a locking device the requirements for strength and reliability are naturally high and also the traditional requirements for lowest possible production cost. It is also desireable, that the device should be equally sensitive for acceleration forces in all directions. The above mentioned requirements have turned out to be very difficult to fulfill in earlier known devices.

The object of the present invention is to produce a locking device of the mentioned kind, in which the above mentioned requirements and desireable aspects are fulfilled to a high degree, so that a simple and low production cost is obtained, but at the same time vary reliable device is presented.

The object of the invention is provided by producing the device which is characterized by that the locking clasp is positioned in the toothed wheels movement connecting space, in normal position resting against its bottom and arranged so that the action devices will be lifted with its clasp against the toothed wheel facing end to engage with these in such a way that the locking clasp in locking position will be locked between a tooth and a wall, belonging to the space.

BRIEF DESCRIPTION OF THE DRAWINGS

FIG. 1 is the patrial sectional view of the belt locking device in its rest position, FIG. 2 is a similar view to FIG. 1, but with the device in its locking position, FIG. 3 is a partial sectional view of a modified form of the belt locking device, FIG. 4 is a partial sectional view of a further modification of the belt locking device.

DESCRIPTION OF THE PREFERRED EMBODIMENT

Figure 5A:
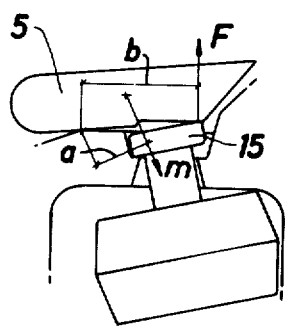
FIG. 5a is a partial sectional view of the device of FIG. 1 showing suitable dimensions thereof, and, FIG. 5b is a view similar to FIG. 2 showing suitable dimensions of the elements.

In the figures numeral 1 indicates a wheel 1 with teeth 2. The wheel 1 is carried by a rotatable shaft (not shown), which is formed as a coil for rolling up the strap of the safety belt. The shaft is in a traditional way influenced by a rotational spring which seeks to turn it counter clockwise (as shown in the figures), whereby the strap is rolled up on to the coil. When the strap is pulled it is unrolled from the coil against the force of the rotational spring and this is the unrolling, which should be stopped when a collision or the similar event occures, when the vehicle in which the safety belt device is positioned is affected by larger acceleration forces.

The wheel 1 is carried in a housing 3 with a chamber 4 positioned approximately tangential to the position of the circumference of the wheel 1. In the chamber 4 there is freely placed a locking clasp 5 with a round back 6 and a pointed head 7. The chamber 4 has a round rear wall 8, which is closely related to the locking clasp's 5 round back 6 and which gradually upwardly transforms into an expansion 9.

The rear wall 8 of the chamber 4 transforms via an intermediate part to a part 10 which in use extends mainly horizontal. After the part 10 a hole 11 is situated with an upper counter sink 12 and an underlying chamber 13. The front wall 8a of chamber 4 slants from counter sink 12.

In the three last mentioned spaces a pendulum 14 is situated with a head 15 in the counter sink 12, a stem 16 running through the hole 11 and a pendulum-weight 17 placed in the chamber 13. The aim of the pendulum head 15 is to cooper-are with the locking clasp 5 and for this purpose clasp 5 is constructed with the slightly sloping stop face 18.

Figure 5B:
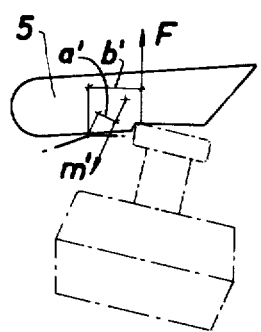

In FIGS. 5a and 5b suitable dimensions are shown of the pendulum 14 and locking clasp 5. Movement of the pendulum 14 frontwards are here shown with unbroken lines and backwards with chain-dotted lines and for this case symbols with '-marks are used. The symbols concerned are:

F= the force with which the locking clasp 5 is affected by the pendulum head 15 at a certain acceleration force;

m= the resulting force of acceleration on the locking clasp 5 (force of gravity/acceleration shock), which force has its origin in the locking clasp's center of gravity;

a= the distance between the center of gravity for the locking clasp 5 and the edge of the horizontal surface 10 at straight angle to the direction of the force m;

b= the distance between the point of application of the force F on the locking clasp 5 and said edge, on which the clasp can tilt.

It is desirable that the force F always is just as large, that means F = F' independent of if the pendulum 14 swings to one side or the other. From the figure can be analyzed, that in the locking device in the invention this can be gained if the relation $$\frac{a}{b} = \frac{a'}{b'}$$

is true.

This is possible by suitably dimensioning the components. By further dimensioning work, namely slightly sloping the surface 18, so that the pendulum head 15 is given a certain free space on its side close to the tilting edge, equal lifting height of the locking clasp 5 can be produced independently of the swinging direction of the pendulum.

On the FIG. 3 there is shown a second embodiment in which the pendulum has been substituted by a ball 19, which is resting in a chamber with a double sided sloping floor 20. By giving the floor's 20 two sides different sloping angles even here an equal lifting height can be secured.

In the embodiment as shown in FIG. 4 the locking device is modified for connection to an electrical contact device for sensing of the acceleration. As long as this has an accepted size an electro magnet 21 is connected to an electric power source and prevents thereby via an angled two armed lever 22 a spring 23 to affect the locking clasp 5. If the acceleration passes over a certain level the elctrical power is broken on the said sensing device, so that the electro magnet 21 no longer can hold back the angled two armed lever 22, but this is swung up by the spring 23.

In the three embodiments, as is shown in the drawings, the locking clasp 5 is the same; the different lies in the devices for affecting the locking clasp 5. In the first embodiment as in FIGS. 1 and 2 this is produced by a pendulum, which when it swings out pivots around one edge of the head 15, whereby the other edge lifts and affects the locking clasp 5. As long as the acceleration forces do no pass a certain level the head 5 rests steadily on the counter sink 12 and the pendulum hangs still in a neutral position. By suitable dimensioning, the limit value for the actuating of the pendulum can be freely chosen. In the second embodiment as shown in FIG. 3 the ball 19 rolls, as shown with the chain-dotted lines, up along the sloping floor 20 when affected by acceleration forces and due to its higher position lifts up the locking clasp 5. In the device as in FIG. 4 the spring 23 lifts up via the lever 22 the locking clasp 5, when the electro magnet 21 has lost its pulling power.

In neutral position the locking clasp 5 moves to the position shown in FIGS. 1, 3, 4, whereby it rests with its bottom against the surface 10 and in the expanded room 9 with its round back 6. The locking clasp's 5 center gravity is situated to the right of the tilt edge of FIG. 1 in the direction of the surface 10. If the locking clasp however in the previous mentioned way is affected by the pendulum 14, the ball 19 respectively or the spring 23 it seeks to tilt counter-clockwise around said tilting edge to the position shown in FIG. 2 by the unbroken lines. If the safety belt strap is affected in this position in the direction for unrolling it seeks to turn the locking wheel 1, which is to be stopped, whereby the first cog 2, which reaches the locking clasp's 5 pointed head 7 will be caught by it and lifted when rotation is continued. Thereby the locking clasp's rounded back 6 is brought out from the expanded room 9 and down into the bottom space with the rounded rear wall 8 and the locking clasp 5 is in this position fixed in between a locking cog and said bottom 8 which is shown by chain-dotted lines in FIG. 2. Thereby the toothed wheel 1 is locked against continued rotation in the direction for unrolling (clockwise in the figures) in a very stable way.

When the normal situation concerning acceleration forces is reestablished the pendulum 14, the ball 19 or the lever 22 resumes neutral position and as soon as the toothed wheel 1 starts to turn in the direction for rolling up, the locking clasp 5 falls down into its resting position under infulence of gravity forces and the pressure from the cogs on its top side. Thereby its rounded back 6 moves from the bottom room 8 up into the expanded space 9. The passage in between must hereby be so formed, so that the locking clasp does not get stuck in this movement and not either in the previous mentioned movement from normal position to locking position, i.e. in the opposite direction.

With proper dimensioning consideration can also be given to acceleration forces in side direction (direction of forces in straight angle to the plane of the paper shown in the figures), so that a suitable actuating force of the lifting height of the locking clasp is gained even in these cases. Furthermore the electrical actuated device as shown in FIG. 4 can alternatively be arranged for opposite working conditions, i.e. so that the effect of the current causes the electro manget to lift off the locking clasp while this is in netural position as long as the electro magnet is without electrical power.

I claim:

1. Acceleration sensitive locking device for vehicle safety belts at least partially coiled on a shaft comprising a toothed wheel connectable to the belt coil shaft, a housing having a chamber with an opening facing said toothed wheel and extending tangentially to said toothed wheel, said chamber having a rounded wall at one end, a slanted wall at its other end and a bottom beneath said opening which bottom extends between said ends and slants to said rounded wall providing a tilt edge therewith, a clasp extending between said ends on said bottom and having a rounded end adjacent said rounded wall and a pointed end adjacent said slanted wall, and means for pivoting said clasp on said tilt edge into engagement with one tooth of said toothed wheel upon the vehicle receiving above normal acceleration forces.

2. Acceleration sensitive locking device as claimed in claim 1 wherein said means consists of a pivotally supported pendulum extending into said chamber beneath said clasp.

3. Acceleration sensitive locking device as claimed in claim 2 wherein said pendulum has a disc shaped head positioned beneath said clasp adjacent said clasp pointed end.

4. Acceleration sensitive locking device as claimed in claim 3 wherein said clasp has a center of gravity between said tilt edge and said disc shaped head of said pendulum.

5. Acceleration sensitive locking device as claimed in claim 1 wherein said means consists of a chamber opening beneath said clasp and having oppositely slanting bottom walls and a ball moveably mounted on said bottom walls, and extending through said chamber opening beneath said clasp.

6. Acceleration sensitive locking device as claimed in claim 1 wherein said means consists of a pivotally mounted lever extending beneath said clasp, resilient means tending to raise said lever for raising said clasp into its toothed wheel engaging position and electrically operated means connected to and normally restraining said lever from raising said clasp until the vehicle receives an undue acceleration force.

* * * * *